United States Patent [19]
Jones et al.

[11] Patent Number: 5,201,541
[45] Date of Patent: Apr. 13, 1993

[54] OCCUPANT RESTRAINT MODULE

[75] Inventors: Robert L. Jones, Centerville; Bruce S. Albright, Xenia, both of Ohio

[73] Assignee: General Motors Corporation, Detroit, Mich.

[21] Appl. No.: 717,605

[22] Filed: Jun. 19, 1991

[51] Int. Cl.$^5$ .................. B60R 21/20; B65D 41/16
[52] U.S. Cl. ................................ 280/731; 280/728; 220/306
[58] Field of Search ............... 280/743, 728, 731, 732; 220/306, 324

[56] References Cited

U.S. PATENT DOCUMENTS

| | | | |
|---|---|---|---|
| 3,145,873 | 8/1964 | Heinle | 220/306 |
| 3,688,942 | 9/1972 | Mitchell et al. | 220/306 |
| 3,979,016 | 9/1976 | Frater | 220/324 |
| 4,111,457 | 9/1978 | Kob et al. | 280/728 |
| 4,793,631 | 12/1988 | Takada | 280/743 |
| 4,941,678 | 7/1990 | Lauritzen et al. | 280/732 |
| 4,989,897 | 2/1991 | Takada | 280/743 |
| 5,022,676 | 6/1991 | Rogerson et al. | 280/743 |

FOREIGN PATENT DOCUMENTS

| | | | |
|---|---|---|---|
| 3545028 | 7/1987 | Fed. Rep. of Germany | 280/743 |
| 0160756 | 6/1989 | Japan | 280/743 |
| 0306847 | 12/1990 | Japan | 280/743 |

Primary Examiner—David M. Mitchell
Attorney, Agent, or Firm—Charles E. Leahy; Herbert Furman

[57] ABSTRACT

An occupant restraint module includes a subassembly of a support member and a folded cushion secured to the support member. The cushion is compressible. A cover assembly receives the subassembly. Cooperating fingers on the support member are engaged with cooperating slots on the cover assembly when the subassembly inserted into the cover assembly.

2 Claims, 3 Drawing Sheets

OCCUPANT RESTRAINT MODULE

BACKGROUND OF THE INVENTION

This invention relates generally to occupant restraint modules and, more particularly, to the securement of a cover assembly of an occupant restraint module.

Known occupant restraint modules generally include a folded occupant restraint cushion and an inflator for inflating the cushion when an appropriate signal is received from a sensor or other device. The cushion and inflator are mounted to a support. A box-like cover houses the folded cushion and inflator and includes terminal flanges which underlie the edge portions of the support. A cover covers the container and includes flanges which overlie and abut the container flanges to the underside of the support. Various brackets and fasteners clamp the flanges of the container and cover to the support. In certain modules, the cover and container are integrated into a cover assembly secured to the support. This invention provides an integral securement of a cover assembly and a support of an occupant restraint module. The integral securement permits the support and cover assembly to be easily assembled to each other and to be disassembled from each other when required without the necessity for brackets, fasteners or non-integral components.

In the preferred embodiment of the invention, the edge portions of the support are formed into return bent flanges, the free or outer legs of which are provided with a series of spaced integral tabs or fingers which extend downwardly with respect to the support or toward the underside thereof. The folded cushion and inflator are mounted to the support, with the cushion being located within the inner legs of the return bent flanges. A cover assembly for the folded cushion and inflator is of generally box-like configuration and includes a lower or substrate member of semi-rigid material, such as plastic, which is appropriately perforated or scored in its upper or base wall and side walls so as to separate into pairs of flaps when the folded cushion is deployed as set forth in Cok et al. U.S. Pat. No. 4,903,986 and co-pending application Ser. No. 529,799, Jones et al. filed May 29, 1990, both assigned to the assignee of this invention. The side walls of the substrate terminate in terminal flanges having laterally inwardly extending legs which are slotted to match and receive respective fingers of the support, and laterally downwardly extending legs. The outer surface of the substrate is covered with a layer of suitable foam material, such as urethane, for decorative and other purposes.

In order to assemble the module, the folded cushion and inflator are assembled to the support in a conventional manner. Thereafter this subassembly is inserted within the cover assembly and forced toward the base or upper wall of the substrate to compress the folded cushion thereagainst. The side walls of the substrate can be notched at the corners thereof to provide for ease of insertion by permitting such walls to flex outwardly during subassembly insertion. The folded cushion is compressed until the fingers of the support move past the slotted terminal flanges of the substrate. Thereafter, the side walls of the substrate self return to their normal unflexed position and the pressure on the support or subassembly is released so that the self expansion force of the compressed cushion moves the subassembly outwardly and moves the fingers of the support within the respective slots of the terminal flanges of the substrate. Thereafter, the fingers can be appropriately bent to prevent disassembly of the assembled module by forcing of the subassembly back into the substrate.

From the foregoing, it can be seen that the securement includes only the use of integral components of the cover assembly and support and does not require the use of any brackets or fasteners. This provides for ease of assembly and reduces the number of parts of the module.

The primary feature of this invention is that it provides an occupant restraint module which does not require any brackets or fasteners in order to assemble a subassembly and a cover assembly of the module to each other. Another feature is that the cover assembly and subassembly are secured to each other by only integral components thereof. A further feature is that one of the subassembly and cover assembly is provided with a series of integral fingers which are received within integral openings of the other of the subassembly and cover assembly and retained therein by the self expansion force of the cushion of the subassembly. Yet, another feature is that the subassembly includes a support having a series of fingers along the edges thereof which are received within slots of terminal flanges of the cover assembly, with the fingers being crimped after being received within the slots to prevent removal thereof.

These and other features will be readily apparent from the following specification and drawings wherein.

Figure 1:
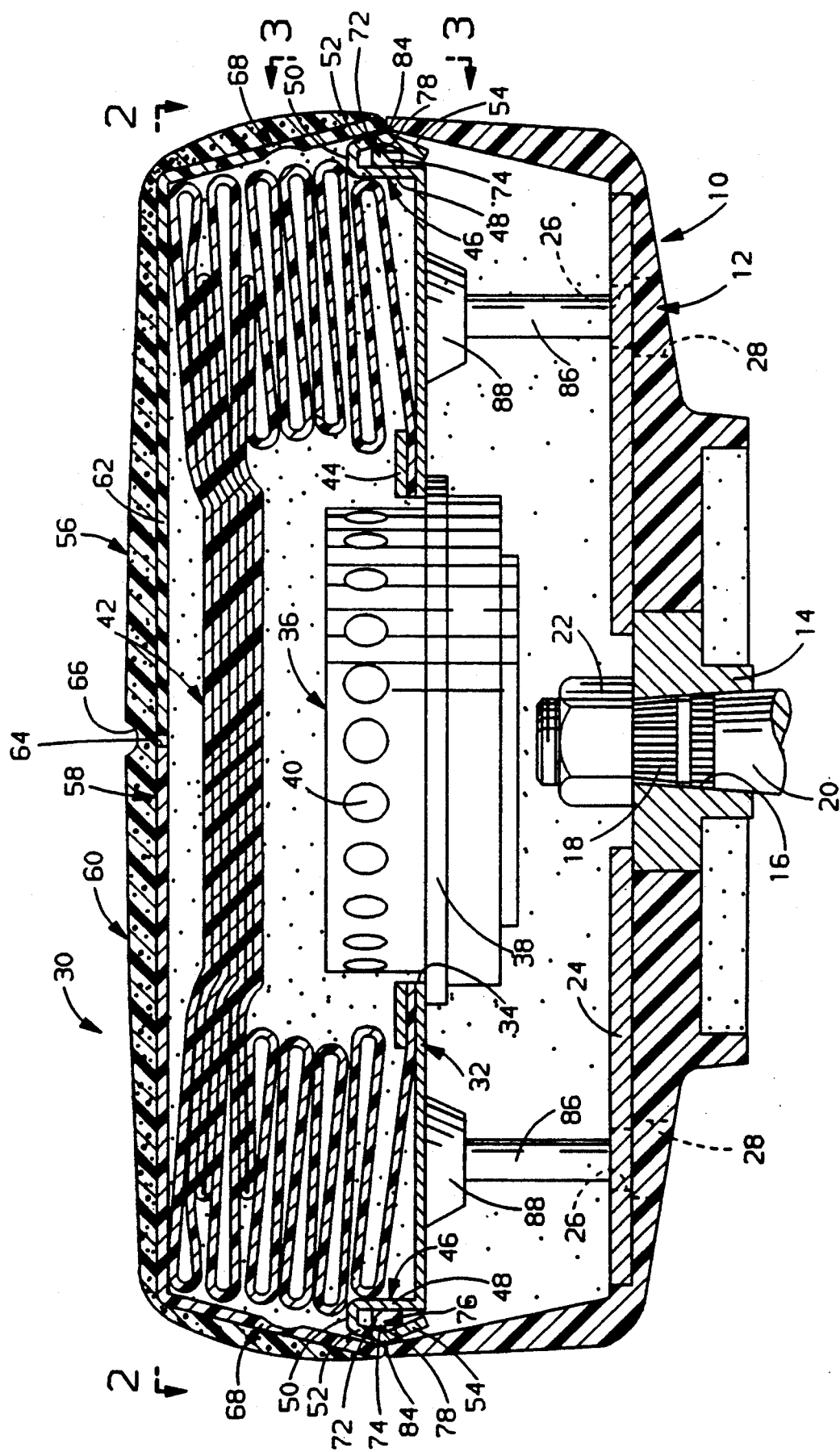
FIG. 1 is a sectional view of an occupant restraint module having a cover assembly according to this invention.

Referring now to FIG. 1 of the drawings, a vehicle steering wheel 10 includes a hub portion 12 of molded plastic having molded therein a central bushing 14. The bushing 14 is provided with a tapered splined opening 16 which receives the tapered splined upper end 18 of the steering shaft 20 to mount the steering wheel thereto. The steering wheel is retained by a nut 22. The steering wheel 10 includes spokes and a rim portion which are not shown and are conventional. A generally rectangularly shaped plate 24 is molded into the upper wall of the hub portion 12 and has an opening 26 therethrough at each corner which opens to a respective opening 28 of hub portion 12.

An occupant restraint module 30 includes a general rectangularly shaped support or plate 32 having a center circular opening 34. An inflator 36 of conventional design includes an intermediate circular flange 38 which seats against the underside of the plate 32 around the opening 34. The upper outlet portion 40 of the inflator projects upwardly through the opening 34 and into the interior of a folded occupant restraint cushion 42 which seats on the upper side of the plate 32. A circular opening of the cushion 42 surrounds the opening 34 and is secured thereto by a bracket 44 and suitable fasteners, not shown. If desired, the fasteners for the bracket 44 can also secure the flange 38 of the inflator to the plate 32. The details of the folded cushion 42 are not shown but reference may be made to Cok et al. U.S. Pat. No. 4,903,986 for these details.

The plate 32 is of generally rectangular configuration and each of the edges thereof is provided with a respective return bent terminal flange 46 having an inner lateral or vertically upwardly extending leg or flange 48, a bight portion 50, and an outer leg or flange 52 which is separated into a series of integral spaced tabs or fingers 54 which extend generally downwardly or toward the underside of the support 32.

Figure 2:
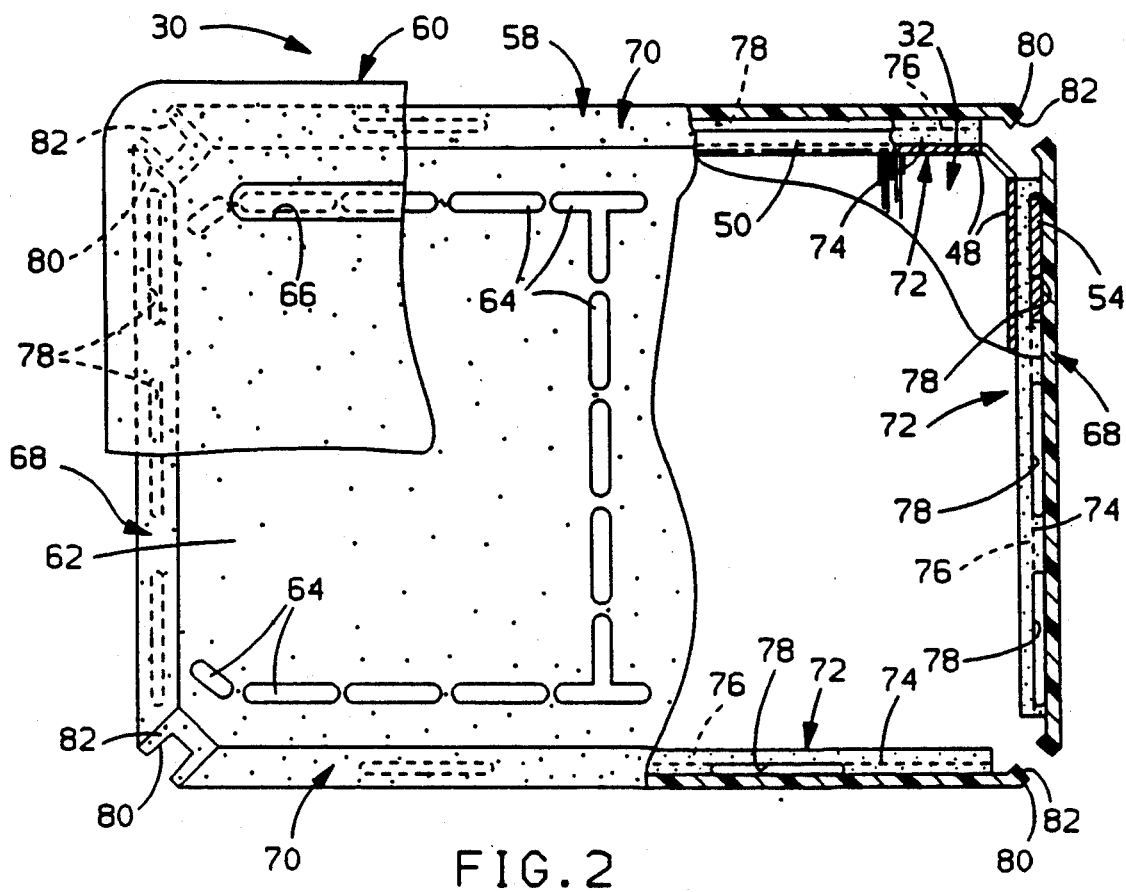
FIG. 2 is a partially broken way view taken generally along the plane indicated by line 2—2 of FIG. 1.
Figure 3:
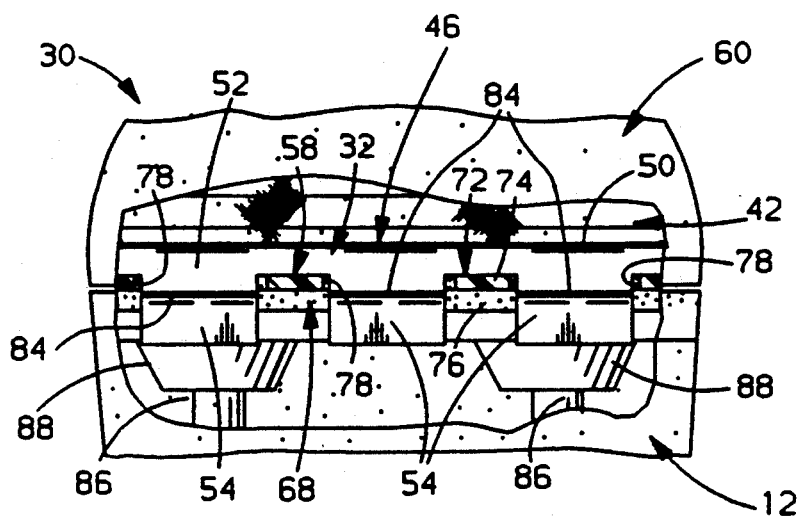
FIG. 3 is a view taken generally along line 3—3 of FIG. 1.
Figure 4:
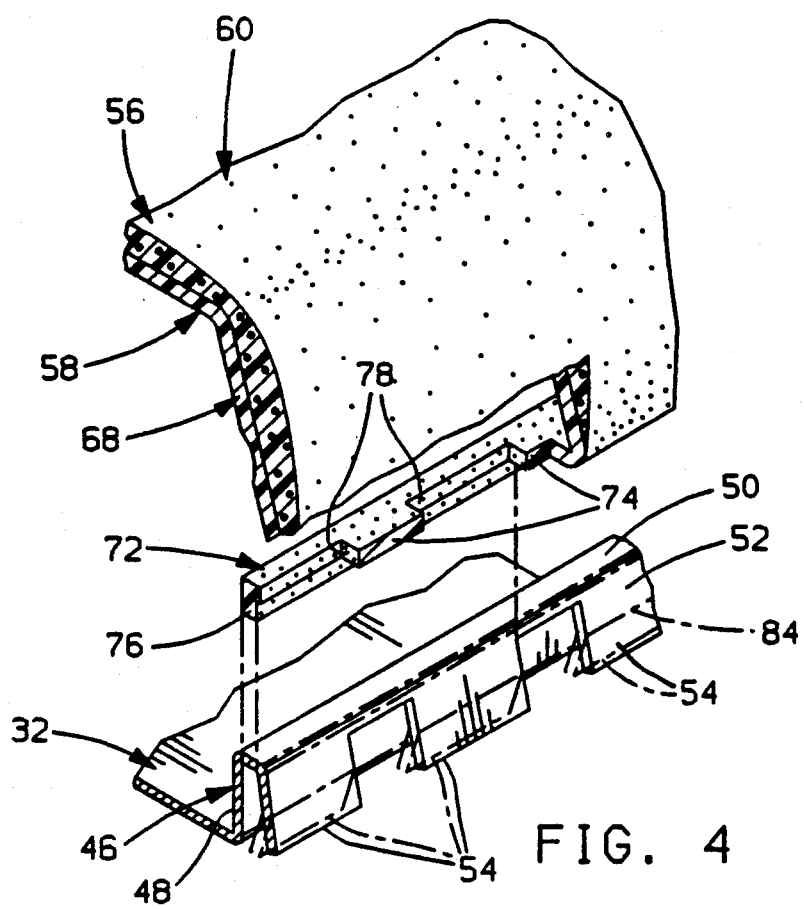
FIG. 4 is a perspective view showing the cover assembly being installed.
Figure 5:
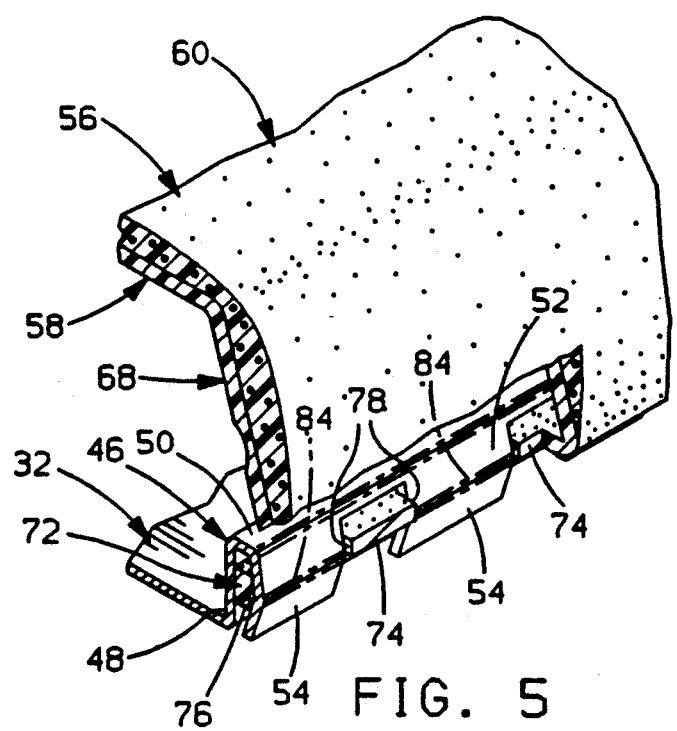
FIG. 5 is a perspective view showing the cover assembly installed.

A cover assembly 56 is of generally box-like configuration and includes a box-like container substrate 58 of generally semi-rigid plastic material and an outer decorative cover 60 of suitable material, such as solid or foam urethane. As shown in FIG. 2, the upper or base wall 62 of the substrate 58 is perforated at 64 in an I pattern, or alternatively in an H pattern, not shown, to provide for separation of this wall into flaps when the folded cushion 42 is deployed as set forth in the aforenoted Cok et al. patent. The cover 60 may be grooved at 66 in alignment with the perforations 64. The lateral side walls 68 of the substrate 58 are tapered slightly outwardly of the base wall, and the longitudinal side walls 70 are likewise tapered. The walls 68 are located in the 3 and 9 o'clock positions and the walls 70 are located in the 6 and 12 o'clock positions.

Each of the walls 68 and 70 includes a generally L shaped terminal flange 72 having a flange portion or leg 74 and a flange portion or leg 76. The flanges 72 are each slotted at 78, with these slots being respective to and matching the fingers 54 along a respective lateral and longitudinal side edge of the plate 32 as indicated in FIG. 2.

After the cushion 42 and the inflator 36 are assembled to the support 32 to provide a subassembly, the subassembly is inserted into the cover assembly 56 by manual or other force applied to the support 32. With reference to FIG. 2, it will be noted that the corners 80 of the substrate 58 may be slotted at 82 to permit the walls 68 and 70 to flex as the outer legs or flanges 52 of plate 32 move past legs 76 of flanges 72 during insertion of the subassembly. As the subassembly is inserted within the cover assembly 56, the folded cushion 42 is compressed against the base or upper wall 62 of the substrate 58 until the fingers 54 move past the legs 74 of flanges 72.

After the fingers 54 move past the legs 74 of flanges 72, the inherent resilience of the walls 68 and 70 returns the walls to their normal unflexed position so that the fingers 54 as aligned with their respective slots 78. Thereafter, by releasing the force on the support 32, the self expansion force of the folded cushion 42 moves the fingers 54 outwardly and into their respective slots 78. Thereafter, each of the fingers can be crimped as indicated at 84 in FIG. 1 to prevent disassembly of the cover assembly 56 from the support 32.

From the foregoing, it can be seen that the cover assembly and subassembly are easily assembled to complete the module and that the securement is provided by integral components or parts of the module so that no individual brackets or fasteners are required.

The inflator 36 may be assembled to the plate 32 after assembly of the plate 32 and cushion 42 subassembly to the cover assembly 56.

The module 30 is conventionally assembled to the hub portion 12 by the use of internally threaded tubular members 86 which extend from embossments 88 of the support 32 and receive bolts which extend upwardly through the openings 26 and 28 of the plate 24 and the hub portion 12.

Thus, this invention provides an integral securement of a cover assembly and subassembly to form an occupant restraint module.

The embodiments of the invention in which an exclusive property or privilege is claimed are defined as follows:

1. An occupant restraint module comprising an inflator, a folded air bag, a support member having the inflator and the folded air bag mounted thereon and having a peripheral edge defined by a plurality of tabs spaced there along and projecting away from the air bag, a box-like cover assembly for covering the cushion and support member and including a base wall and side walls depending from the base wall and having an in-turned flange having a plurality of slots spaced therealong in matching alignment with the tabs of the support member, and said tabs projecting from the support member having a length sufficient to extend through and beyond the slots of the cover assembly flange whereby the cover assembly is mounted on the support member by installing the flange of the cover over the support member with each one of the plurality of slots receiving a complementary one of the tabs of the support member and the tabs being crimped to permanently retain the cover assembly on the support member.

2. An occupant restraint module comprising an inflator, a folded air bag inflatable by the inflator, a support member having the inflator and the folded air bag mounted thereon and having a peripheral edge including a return bent flange defining an inner leg and an outer leg spaced apart by a bight portion, said outer leg having a plurality of tabs spaced therealong and projecting away from the air bag, a box-like cover assembly for covering the cushion and support member and including a base wall engageable by the folded cushion to forcibly compress the folded cushion against the support member to reduce the normal thickness thereof and side walls depending from the base wall and having an in-turned flange engaging with the inner leg and having a plurality of slots spaced therealong in matching alignment with the tabs of the support member, whereby the cover assembly is mounted on the support member by applying a compressive force to the folded cushion to compress the cushion and enable movement of the cover toward the support member and installation of the flange of the cover over the support member with each one of the plurality of slots receiving a matching one of the tabs of the support member and so that the self expansion force of the cushion tending to return the cushion to normal thickness upon removal of the compressive force causes the cover to remain mounted on the support member, and said tabs projecting from the support member having a length sufficient to extend through and beyond the slots of the cover assembly flange to enable crimping of the tabs to permanently retain the cover assembly on the support member.

* * * * *